(12) United States Patent  (10) Patent No.: US 11,099,524 B2
Chiu  (45) Date of Patent: Aug. 24, 2021

(54) WRISTWATCH AND METHOD FOR IMPROVING SECURITY IN ELECTRONIC PAYMENT FOR WRISTWATCH

(71) Applicant: PRINCO CORP., Hsinchu (TW)

(72) Inventor: Pei-Liang Chiu, Hsinchu (TW)

(73) Assignee: PRINCO CORP., Hsinchu (TW)

( * ) Notice: Subject to any disclaimer, the term of this patent is extended or adjusted under 35 U.S.C. 154(b) by 322 days.

(21) Appl. No.: 16/361,868

(22) Filed: Mar. 22, 2019

(65) Prior Publication Data

US 2020/0150596 A1  May 14, 2020

(30) Foreign Application Priority Data

Nov. 14, 2018  (TW) .................................. 107140446

(51) Int. Cl.
| | | |
|---|---|---|
| *G04G 17/08* | (2006.01) | |
| *G04G 17/04* | (2006.01) | |
| *G06F 1/16* | (2006.01) | |
| *G06Q 20/32* | (2012.01) | |

(52) U.S. Cl.
CPC ............ *G04G 17/08* (2013.01); *G04G 17/04* (2013.01); *G06F 1/163* (2013.01); *G06Q 20/3278* (2013.01)

(58) Field of Classification Search
CPC ......... G04G 21/04; G04G 17/04; G04G 17/08
USPC ....................................................... 368/223
See application file for complete search history.

(56) References Cited

U.S. PATENT DOCUMENTS

| | | | |
|---|---|---|---|
| 10,396,441 B2 | 8/2019 | Chiu et al. | |
| 2010/0178873 A1 | 7/2010 | Lee et al. | |
| 2015/0294303 A1* | 10/2015 | Hanson ................ | G06Q 20/321 235/379 |
| 2016/0132881 A1* | 5/2016 | Lee ...................... | G06Q 20/405 705/44 |
| 2016/0299679 A1* | 10/2016 | Park ....................... | G06F 3/041 |
| 2017/0168462 A1 | 6/2017 | Ryu et al. | |
| 2017/0270523 A1 | 9/2017 | Choi | |
| 2018/0267645 A1 | 9/2018 | Chiu | |
| 2019/0251546 A1 | 8/2019 | Khan et al. | |

FOREIGN PATENT DOCUMENTS

| | | |
|---|---|---|
| CN | 105373920 A | 3/2016 |
| CN | 106255984 A | 12/2016 |
| CN | 106922193 A | 7/2017 |
| CN | 107203878 A | 9/2017 |
| CN | 108631805 A | 10/2018 |

(Continued)

*Primary Examiner* — Ajibola A Akinyemi
(74) *Attorney, Agent, or Firm* — Hamre, Schumann, Mueller & Larson, P.C.

(57) ABSTRACT

A wristwatch and a method for improving security in electronic payment for a wristwatch are provided. The wristwatch includes a short distance communication module having a security element. The security element provides security information required in implementing the electronic payment. The wristwatch further includes a controller coupled to the short distance communication module for enabling or disabling the electronic payment executed by the short distance communication module, based on a user operation. In the wristwatch, the electronic payment function can be manually launched or terminated by a user, thereby reducing a risk of being stolen for security data.

18 Claims, 11 Drawing Sheets

(56) References Cited

FOREIGN PATENT DOCUMENTS

| | | |
|---|---|---|
| JP | H0855200 A | 2/1996 |
| JP | 2016134066 A | 7/2016 |
| JP | 2016134066 A | 7/2016 |
| JP | 2018116674 A | 7/2018 |
| JP | 2018116674 A | 7/2018 |
| JP | 2018155727 A | 10/2018 |
| TW | 201835734 A | 10/2018 |

* cited by examiner

WRISTWATCH AND METHOD FOR IMPROVING SECURITY IN ELECTRONIC PAYMENT FOR WRISTWATCH

BACKGROUND

1. Field of the Disclosure

The present application relates to a wristwatch, and more particularly to a wristwatch capable of implementing short distance communication.

2. Description of Related Art

In recent years, electronic payment has been widely applied to various types of consumer payments. Common payment applications such as APPLE PAY and ANDROID PAY use smartphones as tools for payments. The electronic payment is a communication security technology using short distance communication (e.g., RFID and NFC). Integrating this technology into an existing device is often restricted to conditions of the device itself and usually, the technology cannot be smoothly migrated to the device. For example, passwords of inductive credit cards with the electronic payment function are easy to be recorded, causing security concerns. In another aspect, migrating the electronic payment technology to the existing device may have signal transmission weakened and thus the device may not be able to establish communication with a reader to accomplish the payments.

SUMMARY

The present application provides a wristwatch and a method for improving security electronic payment for a wristwatch, which can implement secure electronic payment using the wristwatch.

An aspect of the present application provides a wristwatch, including: a time indicating device, configured to provide time information; a housing, defining a receiving room; a short distance communication module, disposed in the receiving room, configured to implement short distance wireless communication with an external device to achieve electronic payment, the short distance communication module including: a security element, configured to preserve security information required in implementing the electronic payment; and a coil, coupled to the security element, configured to transmit electromagnetic signals carrying the security information and associated information required by the electronic payment, the wristwatch further including: a controller, coupled to the short distance communication module, configured to switch on or off the electronic payment executed by the short distance communication module, responsive to a predetermined user operation.

In an embodiment of the present application, an opening exposes at a side of the housing, and the time indicating device includes: a transparent top cover, covering the exposed opening on the housing, the housing and the transparent top cover defining the receiving room; a dial, disposed in the receiving room; a plurality of physical scales, forming on a face of the dial facing the transparent top cover; at least one physical indicator, located between the dial and the transparent top cover; and a movement, configured to drive the at least one physical indicator to provide the time information by cooperation between the at least one physical indicator and the physical scales on the dial.

In an embodiment of the present application, the housing includes: an outer case having a closed ring structure made of metal material, the closed ring structure having a closed ring configuration constructed by a successive, solid, metal material, the closed ring structure having a first opening at a first side and a second opening at a second side opposite to the first side; and a bottom cover made of metal material, the bottom cover sealing the first opening of the closed ring structure and the transparent top cover sealing the second opening of the closed ring structure, the transparent top cover made of non-metal material.

In an embodiment of the present application, an opening exposes at a side of the housing, and the time indicating device includes: a touch display, covering the exposed opening on the housing but allowing transmission of the electromagnetic signals, the touch display having a function of providing the time information, the receiving room defined between the housing and the touch display.

In an embodiment of the present application, the wristwatch further includes: a transparent conductive film, disposed at a position capable of receiving a user operation and correspondingly generating a detecting signal in response to the user operation, the transparent conductive film including a plurality of conductive wires that are interlaced with each other to construct a plurality of conductive units, the detecting signal corresponding to an integral effect of electrical signal changes of all of the conductive units, wherein the controller is coupled to the transparent conductive film and is configured to receive the detecting signal transmitted from the transparent conductive film and based on the detecting signal, switch on or off the electronic payment executed by the short distance communication module.

In an embodiment of the present application, the transparent conductive film is divided into a first area and a second area that are electrically disconnected from each other; wherein the first area of the transparent conductive film generates a first detecting signal in response to the user operation and based on the first detecting signal, the controller switch on the electronic payment executed by the short distance communication module; and wherein the second area of the transparent conductive film generates a second detecting signal in response to the user operation and based on the second detecting signal, the controller switches off the electronic payment executed by the short distance communication module.

In an embodiment of the present application, the short distance communication module further includes: an amplifier, disposed between the coil and the security element, configured to increase or adjust magnitude of the electromagnetic signals transmitted by the coil to adjust a signal transmission distance.

In an embodiment of the present application, the wristwatch further includes: a transparent conductive film, disposed at a position capable of receiving a user operation and correspondingly generating a detecting signal in response to the user operation, the transparent conductive film including a plurality of conductive wires that are interlaced with each other to construct a plurality of conductive units, the detecting signal corresponding to an integral effect of electrical signal changes of all of the conductive units, wherein the controller is coupled to the transparent conductive film and the amplifier and is configured to receive the detecting signal transmitted from the transparent conductive film and determine a gain of the amplifier according to the detecting signal, wherein based on the gain determined by the controller, the amplifier adjusts the magnitude of the electromagnetic signals transmitted by the coil to adjust the signal sensing distance.

In an embodiment of the present application, the transparent conductive film is divided into a first area and a second area that are electrically disconnected from each other; wherein the first area of the transparent conductive film generates a first detecting signal in response to the user operation and based on the first detecting signal, the controller increases the gain of the amplifier to increase the magnitude of the electromagnetic signals transmitted by the coil; and wherein the second area of the transparent conductive film generates a second detecting signal in response to the user operation and based on the second detecting signal, the controller decreases the gain of the amplifier to decrease the magnitude of the electromagnetic signals transmitted by the coil.

In an embodiment of the present application, the controller controls a period that the short distance communication module is switched on, and automatically switches off the short distance communication module at the end of the period.

In an embodiment of the present application, the wristwatch further includes: a first magnetic isolation layer, formed at a side of the closed ring structure of the housing facing the receiving room; and a second magnetic isolation layer, disposed between the movement and the short distance communication module, wherein the first magnetic isolation layer and the second magnetic isolation layer are configured to absorb the electromagnetic signals.

In an embodiment of the present application, the wristwatch further includes: a third magnetic isolation layer, forming on an inner face of the bottom cover of the housing.

In an embodiment of the present application, the short distance communication module includes a selector and two or more than two security elements, the selector is disposed between the security elements and the coil and is configured to enable one of the security elements and disable all the others of the security elements according to a user operation.

In an embodiment of the present application, the selector is configured to establish a path of connection between the coil and one of the security elements and disconnect paths of connection between the coil and all the others of the security elements to enable the one of the security elements and disable all the others of the security elements.

In an embodiment of the present application, the wristwatch further includes: a transparent conductive film, divided into a plurality of areas that are electrically disconnected from each other, each of the areas including a plurality of conductive wires that are interlaced with each other to construct a plurality of conductive units; and a touch detector, coupled to the selector and electrically connected to each of the areas of the transparent conductive film, configured to detect an integral effect of electrical signal changes of all of the conductive units in each of the areas to output a detecting signal, wherein the selector receives the detecting signal transmitted from the touch detector to enable one of the security elements.

Another aspect of the present application provides a method for improving security in electronic payment for a wristwatch, the wristwatch including a time indicating device and a housing, the time indicating device configured to provide time information, the housing defining a receiving room, the method including: utilizing a short distance communication module to implement short distance wireless communication with an external device to achieve the electronic payment; utilizing a security element of the short distance communication module to preserve security information required in implementing the electronic payment; utilizing a coil of the short distance communication module, coupled to the security element, to transmit short distance wireless communication signals carrying the security information and associated information required by the electronic payment; and utilizing a controller to enable or disable transmission of the short distance wireless communication signals of the coil in response to a predetermined user operation to switch on or off the electronic payment.

In an embodiment of the present application, an opening exposes at a side of the housing, and the time indicating device includes: a transparent top cover, covering the exposed opening on the housing, the housing and the transparent top cover defining the receiving room; a dial, disposed in the receiving room; a plurality of physical scales, forming on a face of the dial facing the transparent top cover; at least one physical indicator, located between the dial and the transparent top cover; and a movement, configured to drive the at least one physical indicator to provide the time information by cooperation between the at least one physical indicator and the physical scales on the dial.

In an embodiment of the present application, the housing includes: an outer case having a closed ring structure made of metal material, the closed ring structure having a closed ring configuration constructed by a successive, solid, metal material, the closed ring structure having a first opening at a first side and a second opening at a second side opposite to the first side; and a bottom cover made of metal material, the bottom cover sealing the first opening of the closed ring structure and the transparent top cover sealing the second opening of the closed ring structure, the transparent top cover made of non-metal material.

In an embodiment of the present application, an opening exposes at a side of the housing, and the time indicating device includes: a touch display, covering the exposed opening on the housing but allowing transmission of the electromagnetic signals, the touch display having a function of providing the time information, the receiving room defined between the housing and the touch display.

In an embodiment of the present application, the method further includes: propagating the short distance wireless communication signals between the short distance communication module and the external device in a single transmission portal allowing transmission of the short distance wireless communication signals.

In an embodiment of the present application, the method further includes: utilizing an amplifier disposed between the coil and the security element to amplify or adjust magnitude of the short distance wireless communication signals transmitted by the coil to adjust a signal transmission distance.

In an embodiment of the present application, the method further includes: utilizing the controller to automatically switch off transmission of the short distance wireless communication signals after a period of time transmission of the short distance wireless communication signals is switched on.

In the present application, the wristwatch has the short distance communication module for transmitting the short distance wireless communication signals. The short distance communication module has the security element and the coil. The security element preserves the security information required in implementing the electronic payment. The coil is used to transmit the short distance wireless communication signals. The electronic payment function is implemented in wristwatch applications. Also, the wristwatch has the controller configured to switch on or off transmission of the short distance communication signals according to the user operation. In some embodiments, the housing of the wristwatch is made of metal material and the transparent top cover and the dial are made of non-metal material. In such a way, the transparent top cover and the dial provides a transmission portal for the short distance wireless communication signals to reduce the possibility of propagating the signals along various of directions, thereby reducing a risk of eavesdropping. In some embodiments, the short distance communication module further includes the amplifier which can amplify or adjust magnitude of the signals transmitted by the coil. Accordingly, the signals weakened due to the deployment of the transmission portal can be compensated. In some embodiments, the short distance communication module can have two or more than two security elements, satisfying a need of a user for using a plurality of payment accounts to make electronic payments.

DETAILED DESCRIPTION OF PREFERRED EMBODIMENTS

To make the objectives, technical schemes, and technical effects of the present application more clearly and definitely, the present application will be described in details below by using embodiments in conjunction with the appending drawings. It should be understood that the specific embodiments described herein are merely for explaining the present application, and as used herein, the term "embodiment" refers to an instance, an example, or an illustration but is not intended to limit the present application. In addition, the articles "a" and "an" as used in the specification and the appended claims should generally be construed to mean "one or more" unless specified otherwise or clear from the context to be directed to a singular form.

The present application relates to a wristwatch and a method for improving security in electronic payment for a wristwatch. The wristwatch may be implemented by a traditional wristwatch with physical indicators (e.g., as an hour hand, a minute hand, and a second hand), and a digital watch or a smartwatch that provides time information using a display. The wristwatch of the present application includes a short distance communication module that can communicate with other electronic devices using short distance communication technologies to achieve the electronic payment function. A controller is disposed in the wristwatch of the present application. Based on a user operation, the controller switches on or off the electronic payment executed by the short distance communication module. The electronic payment function is switched on or off manually by a user, thereby reducing a risk of being stolen for security data.

Figure 1:
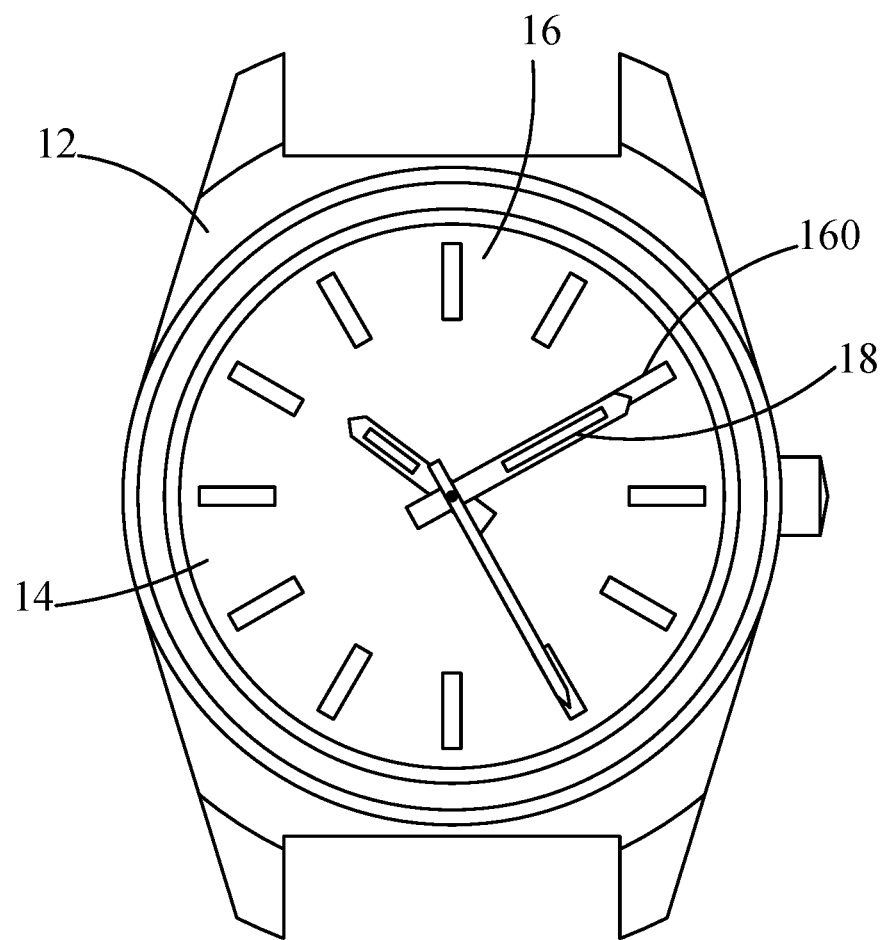
FIG. 1 is a top view of a wristwatch according to an embodiment of the present application.
Figure 2:
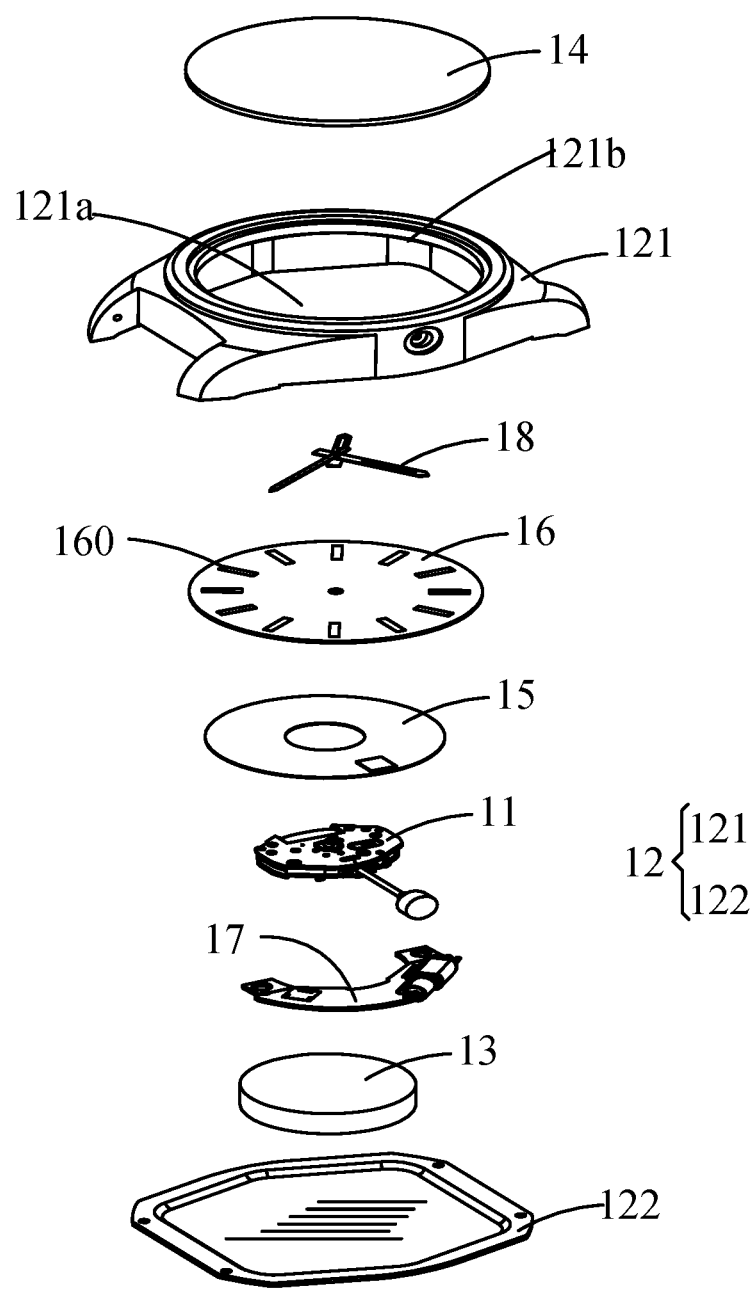
FIG. 2 is an exploded view of the wristwatch shown in FIG. 1.

The following is illustrated using a wristwatch having physical indicators. FIG. 1 is a top view of a wristwatch according to an embodiment of the present application. FIG. 2 is an exploded view of the wristwatch shown in FIG. 1.

As shown in FIGS. 1 and 2, the wristwatch includes a housing 12, a transparent top cover 14, a dial 16, a plurality of physical scales 160 disposed on the dial 16, at least one physical indicator 18, and a movement 11. These elements form a time indicating device configured to provide time information.

An opening exposes at a side of the housing 12. The transparent top cover 14 covers the exposed opening on the housing 12. The housing 12 and the transparent top cover 14 define a receiving room. Specifically, the housing 12 includes an outer case 121 and a bottom cover 122. The outer case 121 has a closed ring structure constructed by a successive solid material. The closed ring structure has a first opening 121a at a first side and a second opening 121b at a second side opposite to the first side. The first opening 121a of the closed ring structure is sealed by the bottom cover 122. The second opening 121b of the closed ring structure is sealed by the transparent top cover 14. The receiving room is defined by the outer case 121, the bottom cover 122, and the transparent top cover 14.

The transparent top cover 14 is made of a transparent substance such as plastic and glass. The transparent top cover 14 is disposed opposite to the bottom cover 122 of the housing 12. Specifically, the transparent top cover 14, the outer case 121, and the bottom cover 122 are arranged from top to bottom to form the receiving room. The transparent top cover 14, the outer case 121, and the bottom cover 122 are configured to protect mechanical structures and/or electronic components disposed in the receiving room.

The dial 16, the at least one physical indicator 18, and the movement 11 are disposed in the receiving room. The physical scales 160 on the dial 16 forms on a face of the dial 16 facing the transparent top cover 14. The at least one physical indicator 18 is located between the dial 16 and the transparent top cover 14. The at least one physical indicator 18 is located above the physical scales 160. Specifically, the physical scales 160 disposed on the face of the dial 16 are one to twelve o'clock, for example. The at least one physical indicator 18 may include an hour hand, a minute hand, and a second hand, or other indicators for specific use.

The movement 11 is used to drive the at least one physical indicator 18 to provide the time information by cooperation between the at least one physical indicator 18 and the physical scales 160 on the dial 16. The transparent top cover 14 is transparent. Through the transparent top cover 14, the user can perceive position information (i.e., the time information) indicated by the at least one physical indicator 18.

The wristwatch further includes a battery 13 configured to supply electric power to the movement 11 (and a short distance communication module 15 and a functional module 17 that will be described in further detail below). Delivery of the electric power of the battery 13 may be in charge of a power management unit (not shown) for providing stable and reliable electric power.

Figure 3:
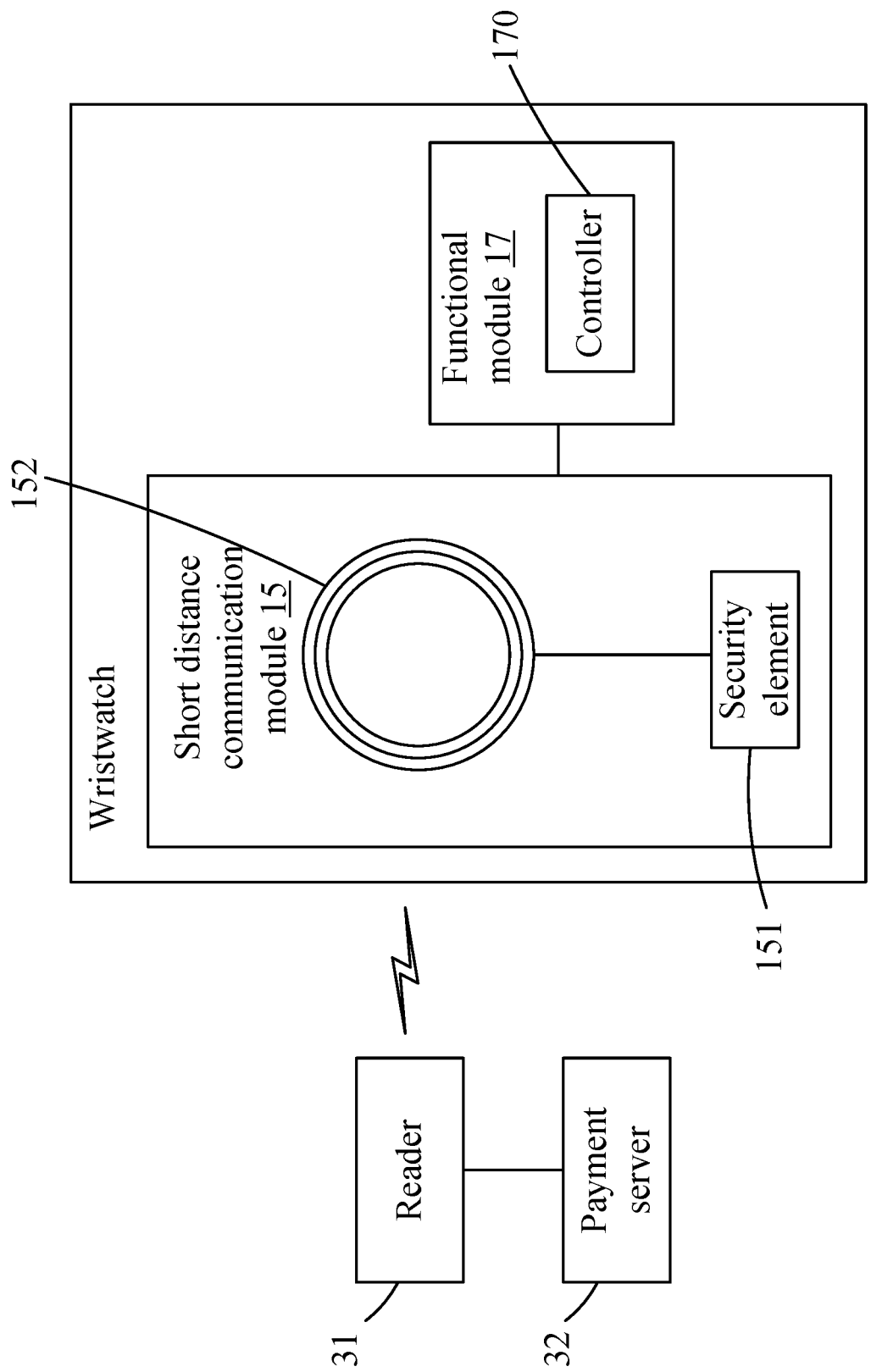
FIG. 3 is a schematic diagram showing an electronic payment framework according to an embodiment of the present application.

FIG. 3 is a schematic diagram showing an electronic payment framework according to an embodiment of the present application. Referring to FIG. 3 with reference to FIG. 2, the wristwatch further includes a short distance communication module 15 disposed in the receiving room. The short distance communication module 15 is used to implement the electronic payment. That is, the wristwatch of the present application has the electronic payment function. The short distance communication module can implement short distance wireless communication module with an external device to achieve the electronic payment. The short distance communication module 15 may include a radio frequency identification (RFID) module or a near field communication (NFC) module but is not limited thereto. The short distance communication module 15 operates at a frequency ranging from 1.32 MHz to 18 MHz (standard frequency is 13.56 MHz). The short distance communication module 15 has a communication distance equal to or less than 20 cm. Specifically, the short distance communication module 15 can communicate with the external device within the communication distance.

For example, the wristwatch may implement the short distance wireless communication to communicate with a reader or a card reader deployed in a store for paying for products that are bought in the store. In another example, the wristwatch communicates with a mobile terminal (e.g., a smartphone and a tablet computer) using the short distance communication module 15 (via NFC communication, for example) to pay another party an agreed amount of money or retrieve the amount of money from another party. This is equivalent to a transaction between two parties. In another example, electronic trading is implemented between two wristwatches having the electronic payment function.

In the wristwatch, the short distance communication module 15 includes a security element 151 and a coil 152. The security element 151 is connected to or coupled to the coil 152.

The short distance communication module 15 of the wristwatch is provided for the electronic payment. Correspondingly, the security element 151 preserves security information required in implementing the electronic payment. The security element 151 may represent a sort of security region that may securely keep or retain critical data such as financial information (e.g., a bank account, a credit card number, a stored-value card number, and a stored-value card balance), authentication information (e.g., a payment account, a password for transaction, and other authentication information), or payment service applications. The security element 151 may store an account which is mapped to a virtual account, an actual account, a deferred payment card or a credit card, a mobile phone payment account, or a prepaid card. The security information required in implementing the electronic payment may include an account, a password for transaction, authentication information, or a unique identification number mapping to a user. The associated information associated with the security information may include background handshake information between electronic components (e.g., handshakes used in a transmission protocol), information associated with a user (e.g., a user identity), an account balance, or a transaction history. Security element 151 may also encrypt or decrypt the aforesaid security information and the associated information. Accordingly, the user can implement the electronic payment using the wristwatch without a need to carry cash, a credit card, or a stored-value card.

The coil 152 is configured to transmit electromagnetic signals carrying the security information and associated information required by the electronic payment. Specifically, when the external device is to transmit signals to the security element 151, the coil 152 generates an electric current varying with time due to external electromagnetic signals. Accordingly, the security element 151 can receive the signals transmitted by the external device. When the security element 151 is to transmit signals to the external device, the coil 152 is applied with an electric current varying with time to generate the electromagnetic signals. That is, the short distance communication module 15 of the wristwatch communicates with the external device (e.g., a card reader) by transmission of the electromagnetic signals (i.e., the short distance wireless communication signals). In the context, the aforesaid "transmitting" can be referred to a pure "sending" action or a pure "receiving" action, but it can also be referred to "transceiving" (i.e., including sending and receiving actions).

As shown in FIG. 3, the wristwatch further includes a controller 170. The controller 170 can be disposed in a functional module 17 of the wristwatch. The controller 170 is coupled to the short distance communication module 15 and is configured to switch on or off the electronic payment executed by the short distance communication module 15, responsive to a predetermined user operation. That is, a user may perform an operation on the wristwatch to switch on or off the short distance communication module 15, thereby enabling or disabling the electronic payment function. In an embodiment, the controller 170 controls a period that the short distance communication module 15 is switched on, and automatically switches off the short distance communication module 15 at the end of the period. Preferably, the short distance communication module 15 will be automatically switched off (i.e., the electronic payment function is terminated) after a period of time (e.g., 10 seconds) the short distance communication module 15 is switched on (i.e., the electronic payment function is launched). This can avoid a risk of being stolen for user security data, that may be caused when signals are still transmitted though the electronic payment function is not used. This also saves unnecessary power consumption.

In the present application, when the electronic payment function is not used by a user, transmission of the short distance communication signals will be disabled, thereby reducing a risk of eavesdropping. Generally speaking, an amount of time required in executing the electronic payment (e.g., an amount of time required for an external card reader to communicate with the wristwatch using the electromagnetic signals) is about 10 seconds. Beyond this period of time, the wristwatch will not irradiate any electromagnetic signal relevant to the electronic payment. Accordingly, the risk of eavesdropping is greatly reduced.

In an example, referring to FIG. 3 once again, a user buys some commodities in a shop and uses the wristwatch to make electronic payment for the bought commodities. A card reader 31 is deployed in the shop. A payment server 32 is deployed in a transaction processing center of a finance unit. The card reader 31 in the shop is connected to the payment server 32 of the finance unit via Internet, a local area network, or other dedicated lines. In making the electronic payment, short distance wireless communication is established between the short distance communication module 15 of the wristwatch and the card reader 31 to proceed with handshakes for transmission of various messages. The card reader 31 reads the security information preserved in the security element 151 of the short distance communication module 15 and transmits both of the security information and a payment amount, for example, to the payment server 32. The payment server 32 confirms whether the transaction is valid or not and sends back to the card reader 31 a transaction result and a message saying the transaction is done. It is noted that the short distance communication module 15 of the wristwatch itself does not directly communicate with the payment server 32.

In the present application, the wristwatch has the short distance communication module 15 for transmitting the short distance wireless communication signals. The short distance communication module 15 has the security element 151 and the coil 152. The security element 151 preserves the security information required in implementing the electronic payment. The coil 152 is used to transmit the short distance wireless communication signals. The electronic payment function is implemented in wristwatch applications. Also, the wristwatch has the controller 170 configured to switch on or off transmission of the short distance communication signals according to the user operation. Accordingly, the electronic payment function can be manually enabled or disabled by the user, thereby reducing a risk of being stolen for security data.

Figure 4:
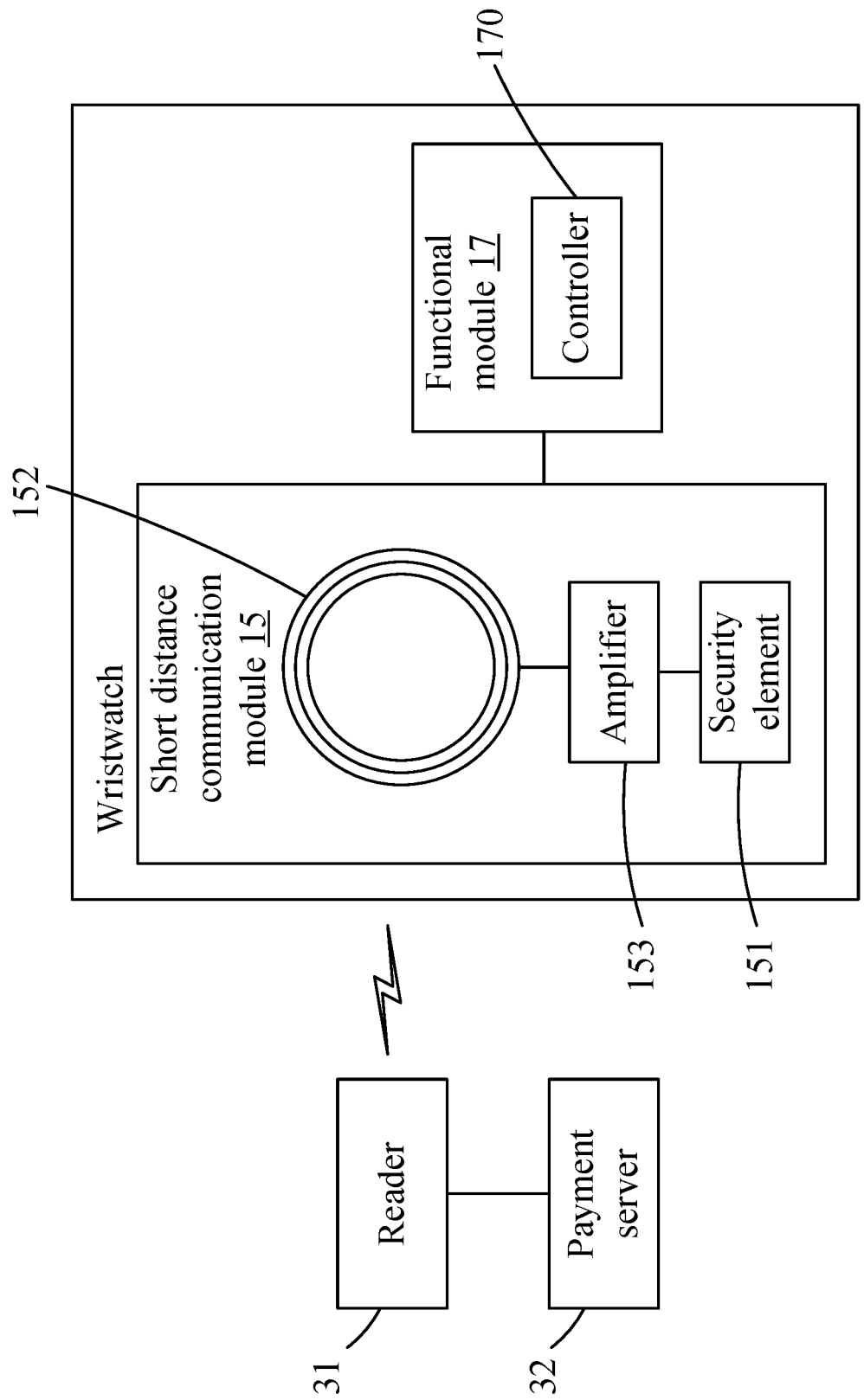
FIG. 4 is a schematic diagram showing an electronic payment framework according to another embodiment of the present application.

FIG. 4 is a schematic diagram showing an electronic payment framework according to another embodiment of the present application. In an embodiment of the present application, the short distance communication module 15 further includes an amplifier 153. The amplifier 153 is disposed between the coil 152 and the security element 151 and is configured to increase or adjust magnitude of the electromagnetic signals transmitted by the coil 151 to adjust a signal transmission distance. Specifically, when the security element 151 is to transmit the electromagnetic signals through the coil 152. An electric current to be applied to the coil 152 by the security element 151 is amplified by the amplifier 153. When the security element 151 is to receive the electromagnetic signals through the coil 152. An electric current generated by the coil 152 is amplified by the amplifier 153 and then transmitted to the security element 151. In such a way, the magnitude of the electromagnetic signals transmitted by the coil 152 is enhanced by the amplifier 153.

A gain of the amplifier 153 may be controlled by the controller 170 of the functional module 17. It can also direct the controller 170 to adjust the gain of the amplifier 153 by a user operation. Specifically, after receiving the user operation, the controller 170 transmits an adjusting signal to the amplifier 153 of the short distance communication module 15 to make the amplifier 153 adjust an amount of an electric current, thereby adjusting the magnitude of the electromagnetic signals transmitted to or received by the coil 152. In another example, after receiving the user operation, the controller 170 can adjust the electric current outputted from the amplifier 153 to be zero or a predetermined amount, or switch the size of the electric current according to a predetermined order. Accordingly, by the user operation, a user can conveniently control the electromagnetic signals transmitted by the coil 152 of the short distance communication module 15 of the wristwatch 10, thereby switching on, off, or adjusting the electromagnetic signals. Accordingly, unnecessary power consumed by the short distance communication module 15 can be reduced.

When the magnitude of the electromagnetic signals transmitted by the short distance communication module 15 of the wristwatch is too small to be detected by the card reader 31 to accomplish the electronic payment, the gain of the amplifier 153 can increase so as to be adaptive to various types of card readers 31. Conversely, when the magnitude of the electromagnetic signals transmitted by the short distance communication module 15 of the wristwatch is too large such that there is a risk of eavesdropping, the gain of the amplifier 153 can decrease such that the electronic payment is implemented while ensuring the security.

The electromagnetic signals transmitted by the short distance communication module 15 of the wristwatch may be attenuated due to interference with inner components (e.g., an electric motor) of the wristwatch. When the housing 12 of the wristwatch is a metal housing, the electromagnetic signals transmitted by the short distance communication module 15 may be shield or weaken by the metal housing. In the present application, the amplifier 153 is disposed in the short distance communication module 15. Accordingly, an adjustment of the gain of the amplifier 153 can change the magnitude of the electromagnetic signals transmitted by the short distance communication module 15, thereby getting a most convenient distance to be used between the wristwatch and the card reader 31 and thus overcoming the problem of the short distance communication signals being shielded or interfered.

In an embodiment of the present application, referring to FIGS. 1, 2, and 4, the outer case 121 and the bottom cover 122 of the housing 12 are made of metal materials and the transparent top cover 14 is made of non-metal material. The closed ring structure of the outer case 121 has a closed ring configuration constructed by a successive, solid, metal material. The bottom cover 122 seals the first opening (e.g., a lower opening) 121a of the closed ring configuration. The transparent top cover 14 seals the second opening (e.g., an upper opening) 121b of the closed ring configuration. This type of wristwatch has a communication portal defined by the second opening (corresponding to the transparent top cover 14 made of the non-metal material) of the closed ring structure of the outer case 121. That is, the coil 152 of the wristwatch transmits or detects the electromagnetic signals mainly by the communication portal. That is, the short distance wireless communication signals are propagated between the short distance communication module 15 and the external device in a single transmission portal allowing transmission of the short distance wireless communication signals. The signals will be shielded or attenuated by the outer case 121 and the bottom cover 122 made of the metal materials. Since the short distance wireless communication signals have a certain degree of directionality, such a wristwatch can avoid a risk of eavesdropping during communication. This structure causes attenuation of communication signals for a certain degree. However, by deploying the amplifier 153 in the short distance communication module 15 (as shown in FIG. 4), the problem of insufficient strength of the communication signals can be overcome. The deployment of the amplifier 153 can be further utilized to overcome the problem of the short distance communication signals being attenuated due to interference with the inner components (e.g., the electric motor) of the wristwatch.

That is, in order to avoid a risk of eavesdropping, the present application adopts the exposed opening on the metal housing 12 as a signal transmission portal (corresponding to the transparent top cover 14 made of the non-metal material). Meanwhile, in order to prevent the signals from being over shielded or weaken, the amplifier 153 is deployed in the short distance communication module 15 to amplify the electromagnetic signals transmitted by the coil 152 or allow a user to make a most appropriate adjustment to the electromagnetic signals. Accordingly, security is improved in implementing the electronic payment function of the wristwatch.

In an embodiment, the aforesaid user operation used to switch on (or off) the short distance communication module 15 or control the gain of the amplifier 153 of the short distance communication module 15 can be implemented by a button or knob (not shown) disposed on the wristwatch. The button or knob is coupled to the controller 170 of the functional module 17. The controller 170 controls the short distance communication module 15 based on an operation to the button or knob.

In an embodiment, the aforesaid user operation used to switch on (or off) the short distance communication module 15 or control the gain of the amplifier 153 of the short distance communication module 15 can be implemented by a motion sensor (e.g., an accelerometer, a gravity sensor, an angular rate sensor, and a gyroscope) (not shown) disposed in the receiving room of the wristwatch. The motion sensor is coupled to the controller 170 of the functional module 17. The controller 170 controls the short distance communication module 15 based on an operation to the motion sensor.

Figure 5:
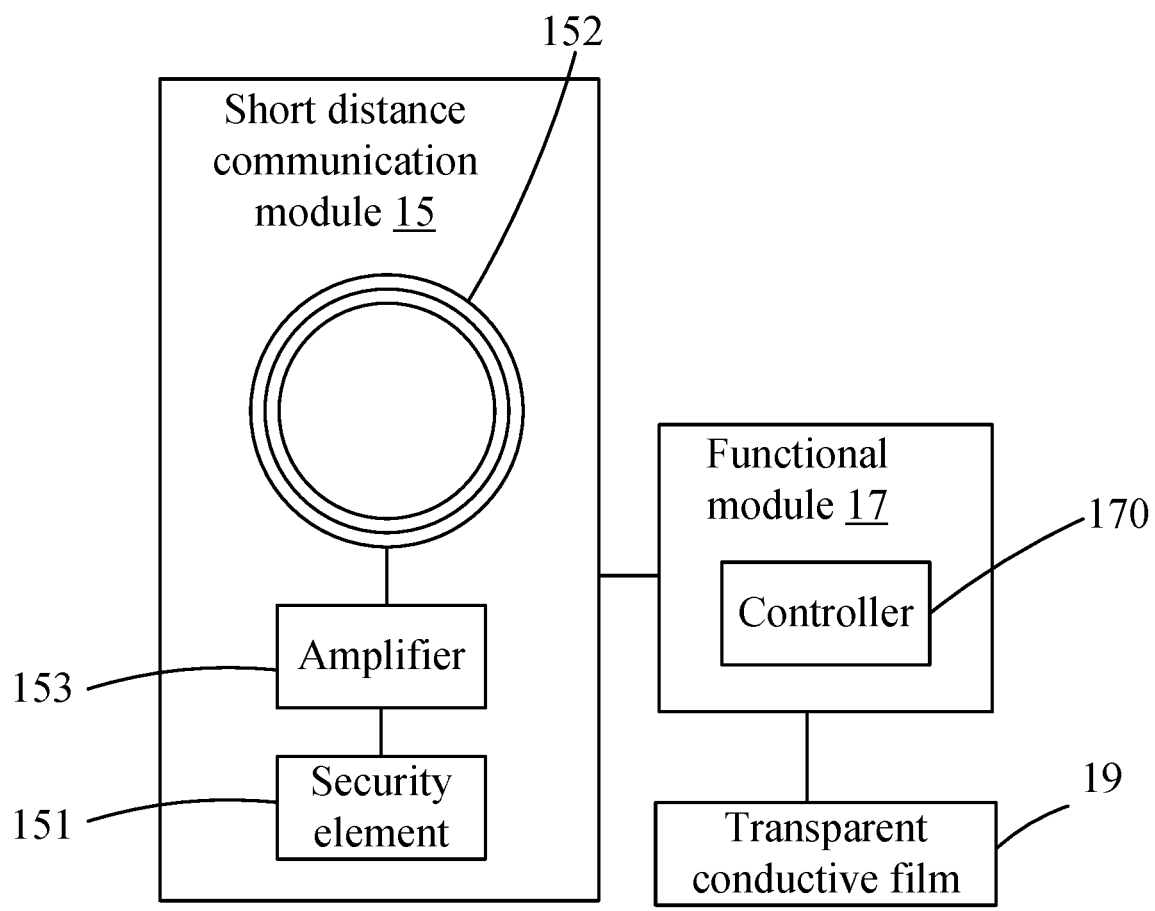
FIG. 5 is a block diagram showing a wristwatch according to an embodiment of the present application.
Figure 6:
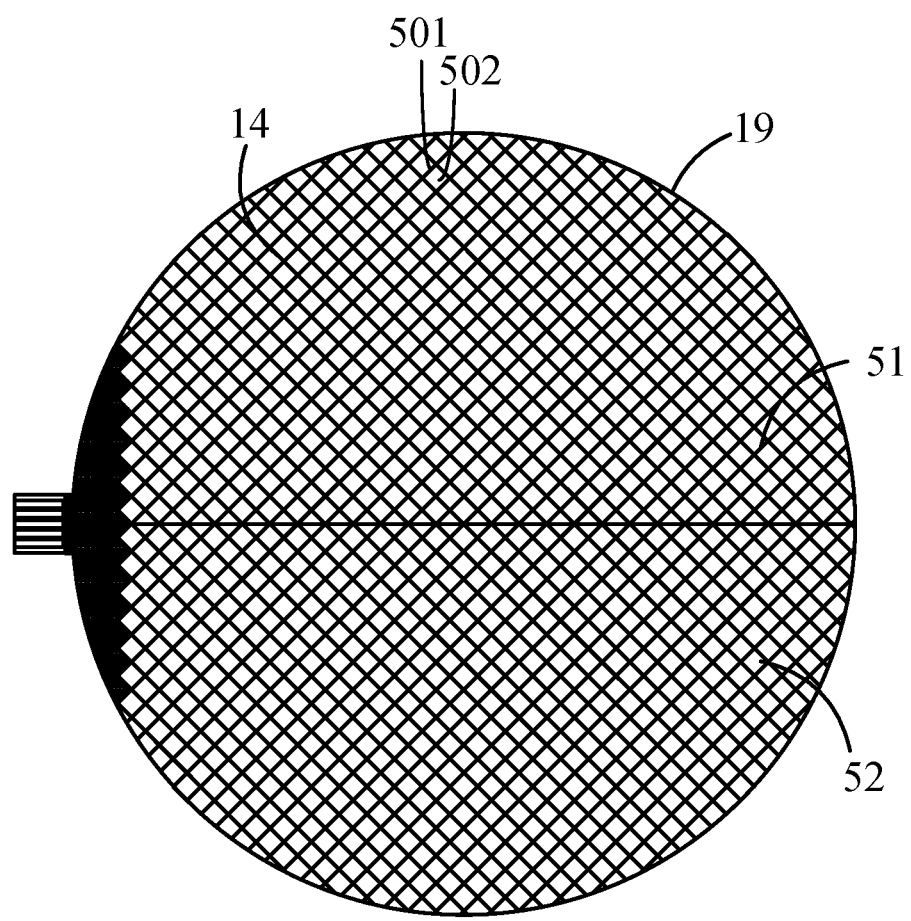
FIG. 6 is a schematic diagram showing a transparent conductive film according to an embodiment of the present disclosure.

In an embodiment, the aforesaid user operation used to switch on (or off) the short distance communication module 15 or control the gain of the amplifier 153 of the short distance communication module 15 can be implemented by a transparent conductive film disposed on the transparent top cover 14 of the wristwatch. FIG. 5 is a block diagram showing a wristwatch according to an embodiment of the present application. FIG. 6 is a schematic diagram showing a transparent conductive film according to an embodiment of the present disclosure. Referring to FIGS. 5 and 6, the wristwatch includes a transparent conductive film 19 disposed on a surface (e.g., an inner surface) of the transparent top cover 14. The transparent conductive film 19 is coupled to the controller 170 of the functional module 17. The transparent conductive film 245 is configured to receive a user operation and generate a detecting signal correspondingly. The controller 170 receives the detecting signal and determine the gain of the amplifier 153 according to the detecting signal. Based on the gain determined by the controller 170, the amplifier 153 adjusts (i.e., increases or decreases) the magnitude of the electromagnetic signals transmitted by the coil 152.

As shown in FIG. 6, the transparent conductive film 19 is a conductive film formed in a mesh shape. In practice, the mesh shape is formed by a plurality of ultra-fine metal lines. Accordingly, when the transparent conductive film 19 is deployed on the transparent top cover 14, a user can still perceive the position indicated by the at least one physical indicator 18. The transparent conductive film 19 can be divided into a first area 51 and a second area 52 that are electrically disconnected from each other. For example, the first area 51 corresponds to top half of the transparent top cover 14 and the second area 52 corresponds to bottom half of the transparent top cover 14. Each of the first area 51 and the second area 52 of the transparent conductive film 19 includes a plurality of conductive wires 501 that are interlaced with each other to construct a plurality of conductive units 502. An integral effect of electrical signal changes (e.g., voltage or current signal changes) of all the conductive units 502 in each area is generated by an approximal action or a touch action performed above or onto the area. That is, the detecting signal can be represented by the integral effect of the electrical signal changes. The first area 51 and the second area 52 are connected to the controller 170 individually. The controller 170 can identify which area (the first area 51 or the second area 52) generates the detecting signal. Herein, the integral effect of the electrical signal changes of all the conductive units 502 in each of the divided areas of the transparent conductive film 19 is contributed by all of or any effective part of the conductive units of each of the divided areas. It can be understood by a person skilled in the art that using the transparent conductive film 19 to detect user operations as described above is apparently different from touch operation sensing technologies used in conventional touch panels and image display technologies with pixel electrodes used in conventional display panels.

In one application scenario, a user long presses top half (i.e., the first area 51) of the transparent top cover 14 to activate the short distance communication module 15 to start the short distance wireless communication (i.e., allowing the electronic payment), and a user short presses bottom half (i.e., the second area 52) of transparent top cover 14 to deactivate the short distance communication module 15 to stop the short distance wireless communication (e.g., terminating the electronic payment). When the short distance wireless communication is started, the user taps top half of transparent top cover 14 to increase the gain of the amplifier 153 to enhance the magnitude of the electromagnetic signals transmitted by the coil 152, and a user taps bottom half of the transparent top cover 14 to decrease the gain of the amplifier 153 to lower the magnitude of the electromagnetic signals transmitted by the coil 152.

Figure 7:
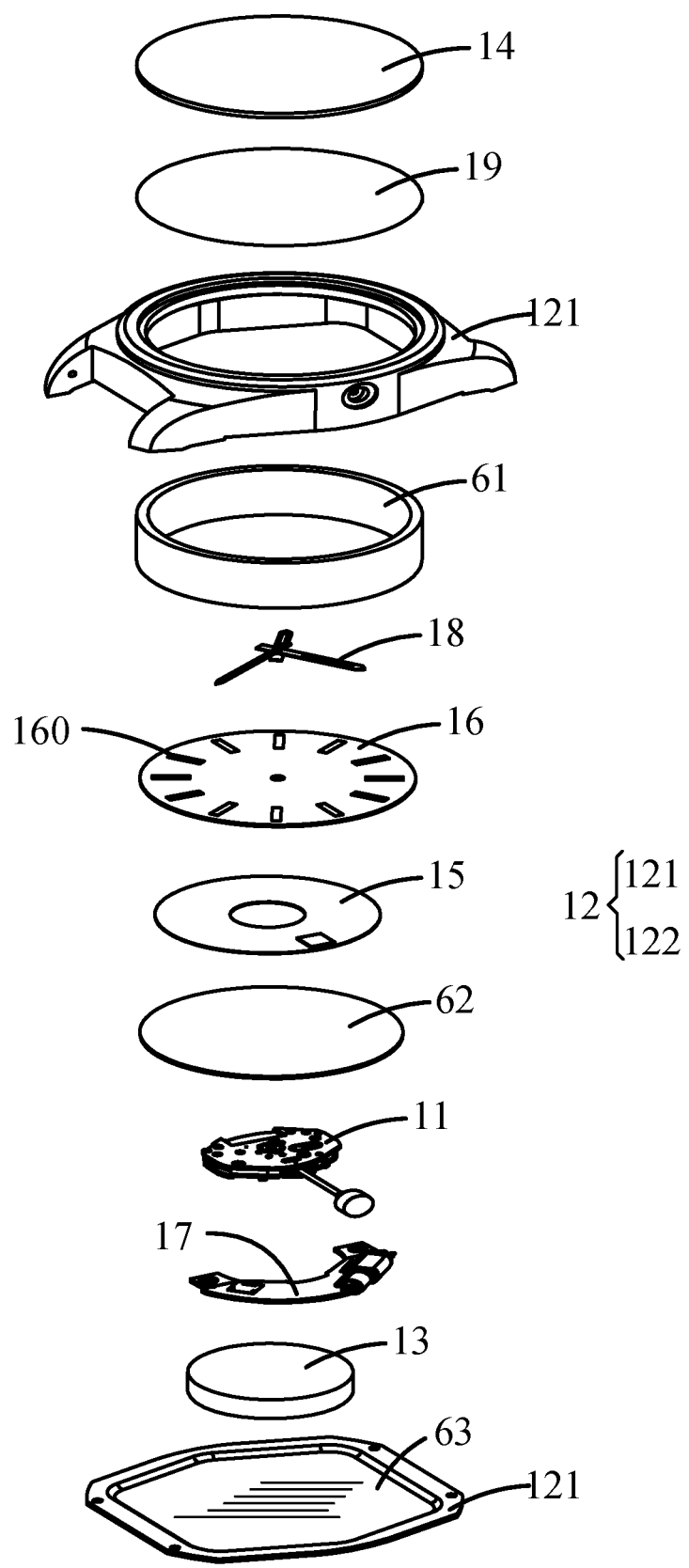
FIG. 7 is an explored view of a wristwatch according to another embodiment of the present application.

The metal or conductive housing 12 (which may include the outer case 121 and the bottom cover 122) will affect the short distance communication module 15 of the wristwatch and will attenuate the electromagnetic signals transmitted between the short distance communication module 15 and the card reader 31. To solve this problem, the present application provides a solution as described below. FIG. 7 is an explored view of a wristwatch according to another embodiment of the present application. Different from the embodiments shown in FIGS. 1 and 2, the wristwatch of the present embodiment deploys a first magnetic isolation layer 61, a second magnetic isolation layer 62, and a third magnetic isolation layer 63 in order to reduce the effects of the metal housing 12 on the short distance communication module 15. These magnetic isolation layers 61, 62, and 63 are configured to absorb the electromagnetic signals to suppress interfering the electromagnetic signals.

Specifically, the first magnetic isolation layer 61 is disposed at a side of the closed ring structure of the metal housing 12 facing the receiving room. The second magnetic isolation layer 62 is disposed below the short distance communication module 15. Preferably, the second magnetic isolation layer 62 is attached below the short distance communication module 15 and is disposed between the movement 11 and the short distance communication module 15. The third magnetic isolation layer 63 is formed on the bottom cover 121 of the housing 12, especially on an inner surface of the bottom cover 121.

In the wristwatch of the present embodiment, when the short distance communication module 15 communicates with the external device (e.g., the reader or the card reader), the electromagnetic signals are transmitted from the external device to the short distance communication module 15. The first magnetic isolation layer 61 and the second magnetic isolation layer 62 can absorb the electromagnetic signals to avoid a situation that the electromagnetic signals cannot be received by the short distance communication module 15 because the electromagnetic signals are affected by the housing 12 and other metal components in the receiving room. Furthermore, the second magnetic isolation layer 62 can avoid a situation that the short distance communication module 15 is affected by the functional module 17 and other metal components beneath the short distance communication module 15. That is, the second magnetic isolation layer 62 can achieve an effect of suppressing interfering the electromagnetic signals. It is noted that the third magnetic isolation layer 63 is an optional element. The third magnetic isolation layer 63 can further absorb electromagnetic signals that are not absorbed by the first magnetic isolation layer 61 and the second magnetic isolation layer 62. It is noted that any one or two of the first magnetic isolation layer 61, the second magnetic isolation layer 62, and the third magnetic isolation layer 63 can be selected to achieve absorbing the electromagnetic signals. Any number of magnetic isolation layers is also workable.

In conventional skills, a short distance communication module cannot be disposed in a communication device with a metal housing or an electrically conductive housing. In the wristwatch of the present embodiment, at least one magnetic isolation layer 61, 62, 63 capable of absorbing the electromagnetic signals is disposed, so as to avoid a situation that the electromagnetic signals cannot be received by the short distance communication module 15 because the electromagnetic signals are affected by the metal or conductive housing 12. As a result, the short distance communication module 15 can be disposed in the communication device with the metal or conductive housing 12 and can still function well.

In some applications, a user may have a need to use a plurality of payment accounts such as a plurality of credit cards, a plurality of electronic wallets, and a plurality of stored-value accounts. In response to such a need, two or more than two security elements may be deployed in the short distance communication module of the wristwatch of the present application. One of the security elements can be enabled for each time the user makes the electronic payment.

The followings are illustrated with a short distance communication module having two security elements. It can be understood that more than two security elements can be disposed in the short distance communication module of the present application, which are operated in a similar fashion.

Figure 8:
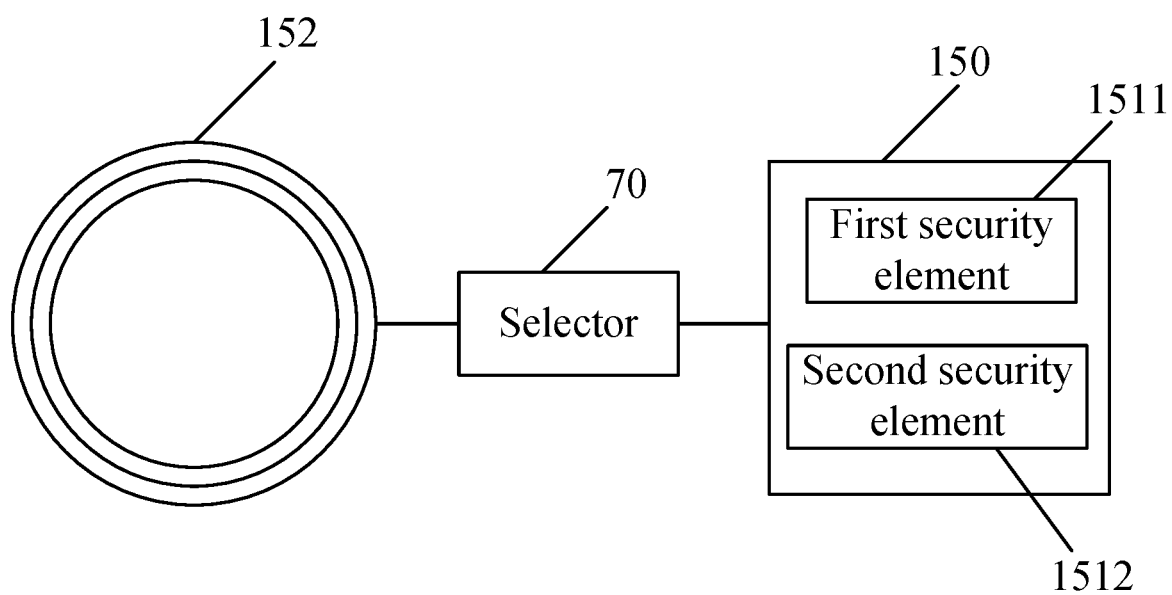
FIG. 8 is a schematic diagram showing a short distance communication module of a wristwatch according to an embodiment of the present application.

FIG. 8 is a schematic diagram showing a short distance communication module 15' of a wristwatch according to an embodiment of the present application. The short distance communication module 15' includes a set of security elements including a first security element 1511 and a second security element 1512, a coil 152, and a selector 70. Details about the coil 152 and the security elements 1511 and 1512 refer to above context. The selector 70 may be disposed inside the housing 12 (see FIG. 1) of the wristwatch. The set of security elements are coupled to the coil 152. The selector 70 is disposed between the set of security elements 150 and the coil 52. Preferably, the selector 70 is coupled between the set of security elements 150 and the coil 152.

The selector 70 is configured to enable one of the first security element 1511 and the second security element 1512 based on a user operation, to transmit and/or receive the electromagnetic signals or the short distance communication signals via the coil 152. Specifically, the selector 70 enables one security element in the set of security elements 150 and disables all the other security elements in the set of security elements 150. That is, when the user wants to use one of the electronic payment accounts or cards (corresponding to one of the security elements) deployed in the wristwatch, by the user operation, the selector 70 can enable one of the security elements to make the other security elements be in a disabled state. Accordingly, the user can select any account or card to make the electronic payment according to its need.

Specifically, the selector 70 may establish a path of connection between the coil 152 and one of the security elements and disconnect paths of connection between the coil 152 and all the other security elements to enable the one security element and disable all the other security elements. In another aspect, the selector 70 may connect a security element to a power source to enable the security element and disconnect a security element from the power source to disable the security element.

In an embodiment, the aforesaid user operation used to enable one of the security elements can be implemented by a button or knob (not shown) disposed on the wristwatch. The button or knob is coupled to the selector 70. Based on an operation to the button or knob, the selector 70 selects one of the security elements to make the electronic payment.

In an embodiment, the aforesaid user operation used to enable one of the security elements can be implemented by a motion sensor (e.g., an accelerometer, a gravity sensor, an angular rate sensor, and a gyroscope) (not shown) disposed in the receiving room of the wristwatch. The motion sensor is coupled to the selector 70. Based on an operation to the motion sensor, the selector 70 selects one of the security elements to make the electronic payment.

Figure 9:
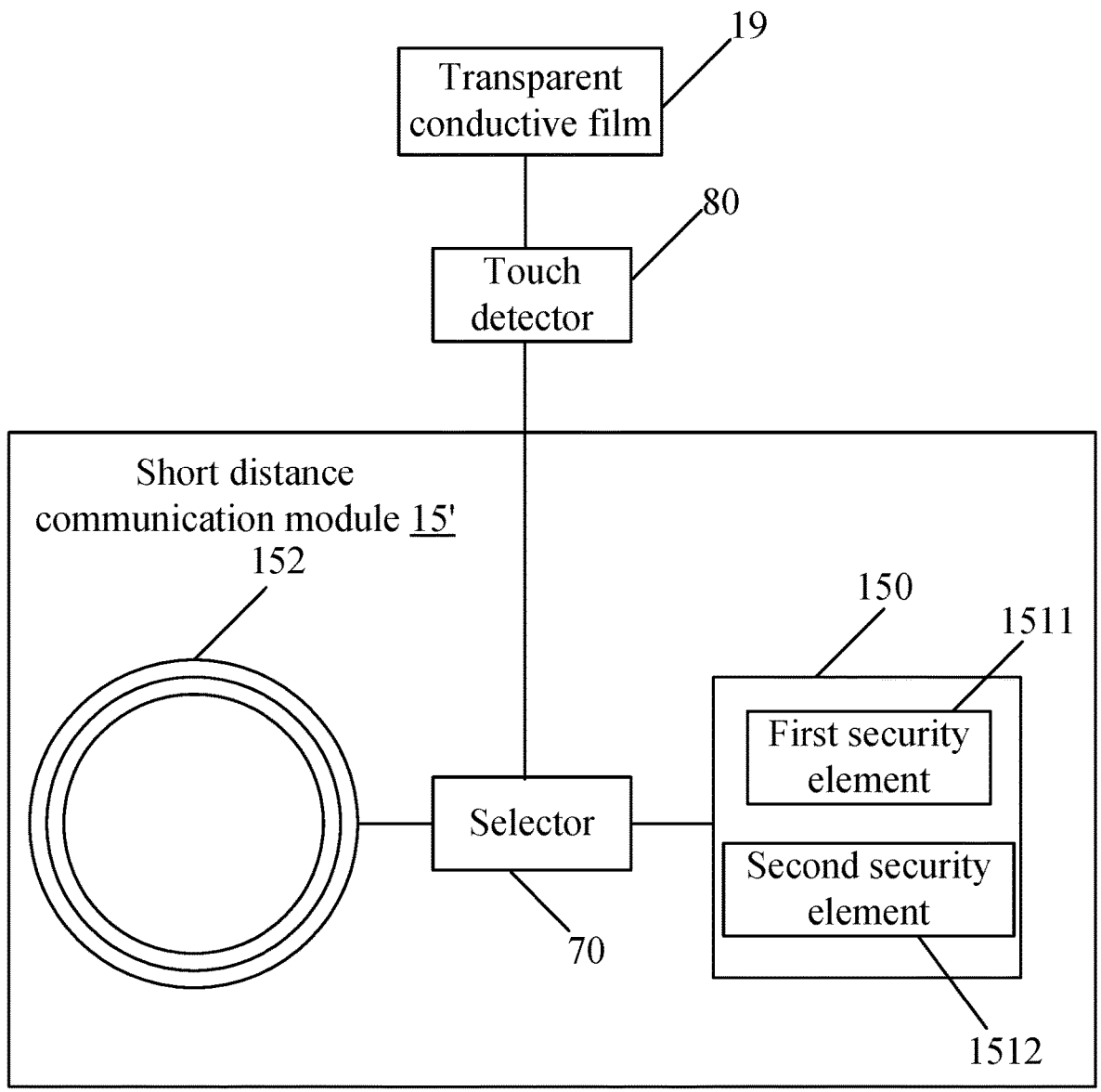
FIG. 9 is a schematic diagram showing a short distance communication module and a structure generating a user operation according to an embodiment of the present application.

Please refer to FIGS. 6 and 9. FIG. 9 is a schematic diagram showing a short distance communication module and a structure generating a user operation according to an embodiment of the present application. As shown in FIG. 9, the wristwatch further includes a transparent conductive film 19 and a touch detector 80. The transparent conductive film 19 is electrically connected to the touch detector 80. The touch detector 80 is coupled to the selector 70. The transparent conductive film 19 is disposed on the wristwatch. For example, the transparent conductive film 19 is disposed on an inner surface of the transparent top cover 14 (see FIG. 2). The touch detector 52 is disposed in the receiving room defined by the housing 12 and the transparent top cover 14. Details about the transparent conductive film 19 can refer to FIG. 5 and above context.

The transparent conductive film 19 is divided into a plurality of areas (e.g., a first area 51 and a second area 52). These areas are electrically disconnected from each other. For example, the first area 51 corresponds to enabling the first security element 1511 and the second area 52 corresponds to enabling the second security element 1512. For example, when the user touches the first area 51 of the transparent conductive film 19, the touch detector 80 outputs a detecting signal to indicate that the first area 51 is touched and correspondingly, the selector 70 receives the detecting signal transmitted from the touch detector 80 to enable the first security element 1511 and disable the second security element 1512. When the user touches the second area 52 of the transparent conductive film 19, the touch detector 80 outputs a detecting signal to indicate that the second area 52 is touched and correspondingly, the selector 70 receives the detecting signal transmitted from the touch detector 80 to enable the second security element 1512 and disable the first security element 1511.

The wristwatches illustrated in above embodiments may be equipped with a display having a touch function, and made of non-metal material or allowing the electromagnetic signals to pass through, to replace the physical scales, the dial, the indicator, and the movement to provide the time information or other information.

Figure 10:
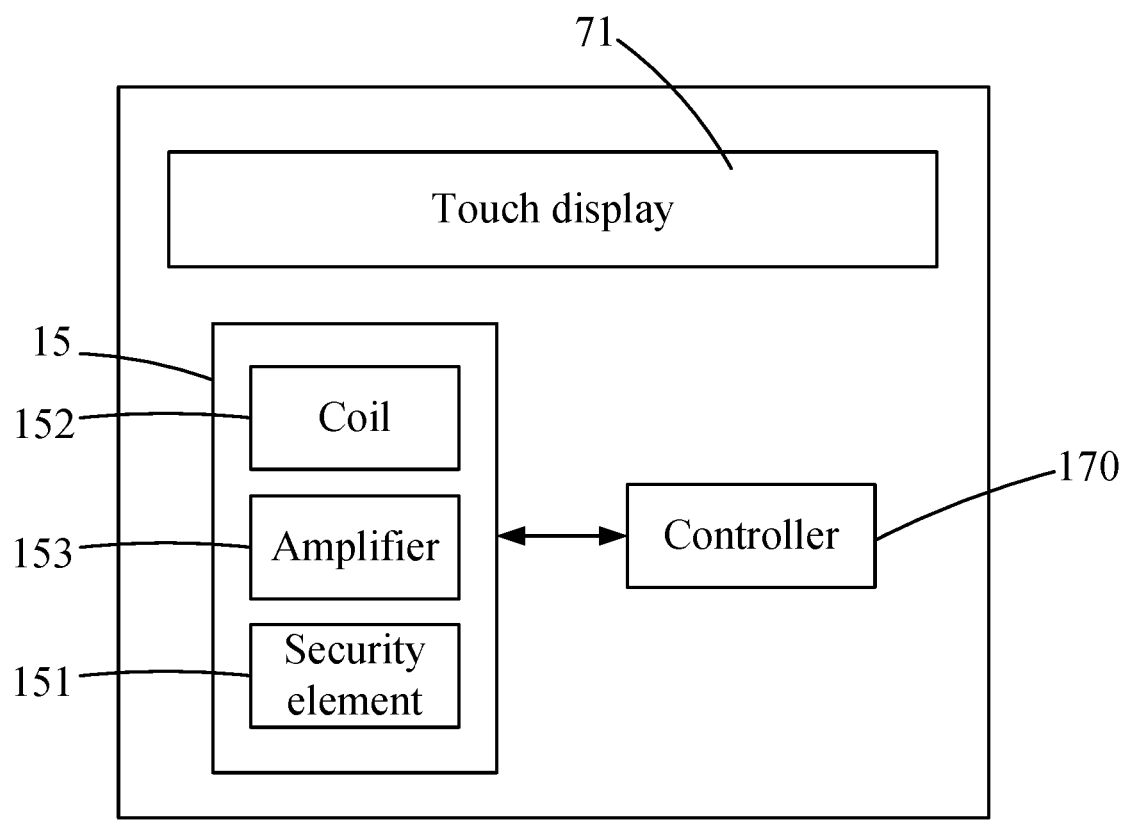
FIG. 10 is an explored view of a wristwatch according to another embodiment of the present application.

As shown in FIG. 10, the wristwatch of the present application is not limited to a wristwatch having the physical indicator (e.g., an hour hand and a minute hand). It can be a wristwatch having a display or a touch display (e.g., a smartwatch). As shown in FIG. 10, the wristwatch has a touch display 71 having an ability to provide the time information. The touch display 71 may display other information. The wristwatch deploys a short distance communication module 15 including a security element 151 and a coil 152. An amplifier 153 may be further deployed as desired to amplify the electromagnetic signals transmitted by the coil 152. In some embodiments, the touch display 71 covers the exposed opening on the housing of the wristwatch but allows the electromagnetic signals to pass through. The housing and the touch display 71 of the wristwatch defines a receiving room for accommodating the short distance communication module 15, a controller 170, and other electronic components. The housing of the wristwatch may be made of metal material. It can also be made of non-metal material. Basically, the touch display 71 will not significantly interfere or shield the electromagnetic signals transmitted by the coil 152.

Figure 11:
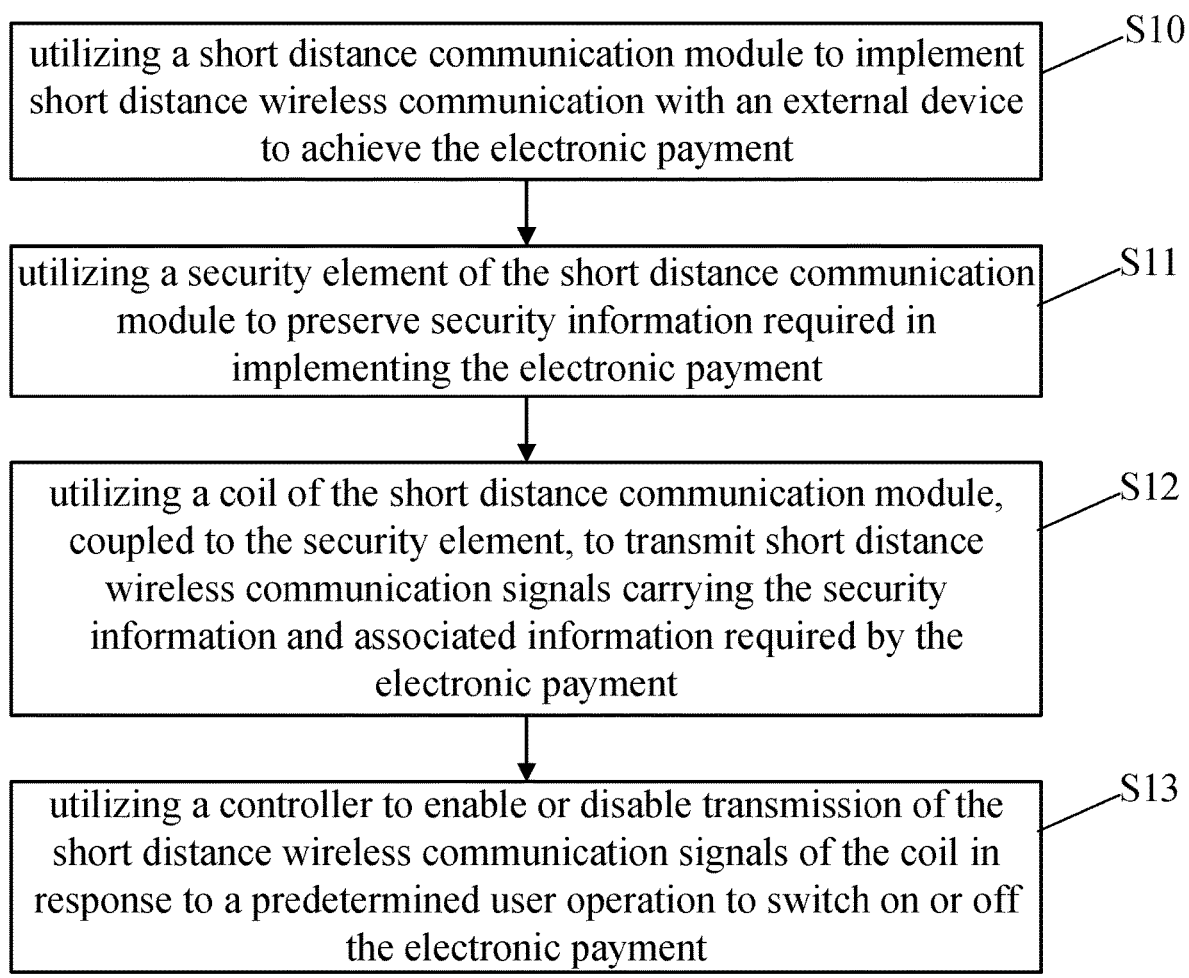
FIG. 11 is a flow chart of a method for improving security in electronic payment for a wristwatch according to an embodiment of the present application.

FIG. 11 is a flow chart of a method for improving security in electronic payment for a wristwatch according to an embodiment of the present application. The wristwatch includes a time indicating device and a housing. The time indicating device is configured to provide time information. The housing defines a receiving room. Referring to FIG. 11 with reference to above context, the method includes the following steps.

Step S10—utilizing a short distance communication module 15 to implement short distance wireless communication with an external device to achieve the electronic payment.

Step S11—utilizing a security element 151 of the short distance communication module 15 to preserve security information required in implementing the electronic payment.

Step S12—utilizing a coil 152 of the short distance communication module 15, coupled to the security element 151, to transmit short distance wireless communication signals carrying the security information and associated information required by the electronic payment.

Step S13—utilizing a controller 170 to enable or disable transmission of the short distance wireless communication signals of the coil 152 in response to a predetermined user operation to switch on or off the electronic payment.

The method may further include propagating the short distance wireless communication signals between the short distance communication module 15 and the external device in a single transmission portal allowing transmission of the short distance wireless communication signals.

The method may further include utilizing an amplifier 153 disposed between the coil 152 and the security element 151 to increase or adjust magnitude of the electromagnetic signals transmitted by the coil 152 to adjust a signal transmission distance.

The method may further include utilizing the controller 170 to automatically switch off transmission of the short distance wireless communication signals after a period of time the transmission of the short distance wireless communication signals is switched on.

Other details about the method of the present application can be referred to the descriptions on the wristwatch in above context, and are not repeated herein.

The method of the present application illustrated in FIG. 11 is applicable to a wristwatch having the physical indicator (as shown in FIGS. 1 and 2). The housing (including the outer case and the bottom cover) of the wristwatch are made of metal material. It is also applicable to a wristwatch having the display or the touch display (as shown in FIG. 10), for example, a smartwatch. It can also use the amplifier 153 shown in FIG. 4 to amplify the electromagnetic signals transmitted in short distance communication. In addition, it can also use the selector 70 shown in FIG. 8 to select one of the security elements to enable the one security element and disable all the other security elements.

While the preferred embodiments of the present application have been illustrated and described in detail, various modifications and alterations can be made by persons skilled in this art. The embodiment of the present application is therefore described in an illustrative but not restrictive sense. It is intended that the present application should not be limited to the particular forms as illustrated, and that all modifications and alterations which maintain the realm of the present application are within the scope as defined in the appended claims.

The invention claimed is:

1. A wristwatch, comprising:
    a time indicating device, configured to provide time information;
    a housing, defining a receiving room;
    a short distance communication module, disposed in the receiving room, configured to implement short distance wireless communication with an external device to achieve electronic payment, the short distance communication module comprising:
    a security element, configured to preserve security information required in implementing the electronic payment; and
    a coil, coupled to the security element, configured to transmit electromagnetic signals carrying the security information and associated information required by the electronic payment,
    the wristwatch further comprising:
    a transparent conductive film, disposed at a position capable of receiving a user operation and correspondingly generating a detecting signal in response to the user operation, the transparent conductive film comprising a plurality of conductive wires that are interlaced with each other to construct a plurality of conductive units, the detecting signal corresponding to an integral effect of electrical signal changes of all of the conductive units; and
    a controller, coupled to the transparent conductive film and the short distance communication module, configured to receive the detecting signal transmitted from the transparent conductive film and based on the detecting signal, switch on or off the electronic payment executed by the short distance communication module, responsive to the user operation,
    wherein the transparent conductive film is divided into a first area and a second area that are electrically disconnected from each other;
    wherein the first area of the transparent conductive film generates a first detecting signal in response to the user operation and based on the first detecting signal, the controller switch on the electronic payment executed by the short distance communication module; and
    wherein the second area of the transparent conductive film generates a second detecting signal in response to the user operation and based on the second detecting signal, the controller switches off the electronic payment executed by the short distance communication module.

2. The wristwatch according to claim 1, wherein an opening exposes at a side of the housing, and the time indicating device comprises:
a transparent top cover, covering the exposed opening on the housing, the housing and the transparent top cover defining the receiving room;
a dial, disposed in the receiving room;
a plurality of physical scales, forming on a face of the dial facing the transparent top cover;
at least one physical indicator, located between the dial and the transparent top cover; and
a movement, configured to drive the at least one physical indicator to provide the time information by cooperation between the at least one physical indicator and the physical scales on the dial.

3. The wristwatch according to claim 2, wherein the housing comprises:
an outer case having a closed ring structure made of metal material, the closed ring structure having a closed ring configuration constructed by a successive, solid, metal material, the closed ring structure having a first opening at a first side and a second opening at a second side opposite to the first side; and
a bottom cover made of metal material, the bottom cover sealing the first opening of the closed ring structure and the transparent top cover sealing the second opening of the closed ring structure, the transparent top cover made of non-metal material.

4. The wristwatch according to claim 3, further comprising:
a first magnetic isolation layer, formed at a side of the closed ring structure of the housing facing the receiving room; and
a second magnetic isolation layer, disposed between the movement and the short distance communication module,
wherein the first magnetic isolation layer and the second magnetic isolation layer are configured to absorb the electromagnetic signals.

5. The wristwatch according to claim 4, further comprising:
a third magnetic isolation layer, forming on an inner face of the bottom cover of the housing.

6. The wristwatch according to claim 1, wherein an opening exposes at a side of the housing, and the time indicating device comprises:
a touch display, covering the exposed opening on the housing but allowing transmission of the electromagnetic signals, the touch display having a function of providing the time information, the receiving room defined between the housing and the touch display.

7. The wristwatch according to claim 1, wherein the short distance communication module further comprises:
an amplifier, disposed between the coil and the security element, configured to increase or adjust magnitude of the electromagnetic signals transmitted by the coil to adjust a signal transmission distance.

8. The wristwatch according to claim 7,
wherein the controller is coupled to the transparent conductive film and the amplifier and is configured to receive the detecting signal transmitted from the transparent conductive film and determine a gain of the amplifier according to the detecting signal, wherein based on the gain determined by the controller, the amplifier adjusts the magnitude of the electromagnetic signals transmitted by the coil to adjust the signal sensing distance.

9. The wristwatch according to claim 8,
wherein the first area of the transparent conductive film generates a third detecting signal in response to the user operation and based on the third detecting signal, the controller increases the gain of the amplifier to increase the magnitude of the electromagnetic signals transmitted by the coil; and
wherein the second area of the transparent conductive film generates a fourth detecting signal in response to the user operation and based on the fourth detecting signal, the controller decreases the gain of the amplifier to decrease the magnitude of the electromagnetic signals transmitted by the coil.

10. The wristwatch according to claim 1, wherein the controller controls a period that the short distance communication module is switched on, and automatically switches off the short distance communication module at the end of the period.

11. The wristwatch according to claim 1, wherein the short distance communication module comprises a selector and two or more than two security elements, the selector is disposed between the security elements and the coil and is configured to enable one of the security elements and disable all the others of the security elements according to a user operation.

12. The wristwatch according to claim 11, wherein the selector is configured to establish a path of connection between the coil and one of the security elements and disconnect paths of connection between the coil and all the others of the security elements to enable the one of the security elements and disable all the others of the security elements.

13. The wristwatch according to claim 12, further comprising:
a touch detector, coupled to the selector and electrically connected to each of the areas of the transparent conductive film, configured to detect an integral effect of electrical signal changes of all of the conductive units in each of the areas to output a detecting signal,
wherein the selector receives the detecting signal transmitted from the touch detector to enable one of the security elements.

14. A method for improving security in electronic payment for a wristwatch, the wristwatch comprising a time indicating device and a housing, the time indicating device configured to provide time information, the housing defining a receiving room, the method comprising:
utilizing a short distance communication module to implement short distance wireless communication with an external device to achieve the electronic payment;
utilizing a security element of the short distance communication module to preserve security information required in implementing the electronic payment;
utilizing a coil of the short distance communication module, coupled to the security element, to transmit short distance wireless communication signals carrying the security information and associated information required by the electronic payment;
utilizing a transparent conductive film to receive a user operation and generate a detecting signal in response to the user operation, wherein the transparent conductive film comprises a plurality of conductive wires that are interlaced with each other to construct a plurality of conductive units, and the detecting signal corresponds to an integral effect of electrical signal changes of all of the conductive units; and utilizing a controller coupled to the transparent conductive film and the short distance communication module to receive the detecting signal transmitted from the transparent conductive film and based on the detecting signal, to enable or disable transmission of the short distance wireless communication signals of the coil in response to the user operation to switch on or off the electronic payment implemented by the short distance communication module, wherein the transparent conductive film is divided into a first area and a second area that are electrically disconnected from each other;

wherein the first area of the transparent conductive film generates a first detecting signal in response to the user operation and based on the first detecting signal, the controller switch on the electronic payment executed by the short distance communication module; and wherein the second area of the transparent conductive film generates a second detecting signal in response to the user operation and based on the second detecting signal, the controller switches off the electronic payment executed by the short distance communication module.

15. The method according to claim 14, wherein an opening exposes at a side of the housing, and the time indicating device comprises:

a transparent top cover, covering the exposed opening on the housing, the housing and the transparent top cover defining the receiving room;

a dial, disposed in the receiving room;

a plurality of physical scales, forming on a face of the dial facing the transparent top cover;

at least one physical indicator, located between the dial and the transparent top cover; and a movement, configured to drive the at least one physical indicator to provide the time information by cooperation between the at least one physical indicator and the physical scales on the dial.

16. The method according to claim 15, wherein the housing comprises:

an outer case having a closed ring structure made of metal material, the closed ring structure having a closed ring configuration constructed by a successive, solid, metal material, the closed ring structure having a first opening at a first side and a second opening at a second side opposite to the first side; and a bottom cover made of metal material, the bottom cover sealing the first opening of the closed ring structure and the transparent top cover sealing the second opening of the closed ring structure, the transparent top cover made of non-metal material.

17. The method according to claim 14, wherein an opening exposes at a side of the housing, and the time indicating device comprises:

a touch display, covering the exposed opening on the housing but allowing transmission of the electromagnetic signals, the touch display having a function of providing the time information, the receiving room defined between the housing and the touch display.

18. The method according to claim 14, further comprising:

propagating the short distance wireless communication signals between the short distance communication module and the external device in a single transmission portal allowing transmission of the short distance wireless communication signals.

* * * * *